United States Patent
Schonhoff et al.

[11] Patent Number: 6,003,912
[45] Date of Patent: Dec. 21, 1999

[54] BI-METAL VEHICLE BUMPER STRUCTURE

[75] Inventors: Donald W. Schonhoff, Rochester; Gerald P. Pokriefka; John A. DiGasbarro, both of Clarkston, all of Mich.

[73] Assignee: Chrysler Corporation, Auburn Hills, Mich.

[21] Appl. No.: 08/630,031

[22] Filed: Apr. 9, 1996

[51] Int. Cl.$^6$ ..................................................... B60R 19/04
[52] U.S. Cl. ........................................... 293/122; 403/404
[58] Field of Search .......................... 293/102, 120–122, 293/155; 296/146.6, 205, 188; 403/179, 404

[56] References Cited

U.S. PATENT DOCUMENTS

| | | | |
|---|---|---|---|
| 3,655,231 | 4/1972 | Killga, Jr. | 293/155 X |
| 4,998,761 | 3/1991 | Bayer et al. | 293/121 |
| 5,080,411 | 1/1992 | Stewart et al. | 293/122 |
| 5,340,178 | 8/1994 | Stewart et al. | 293/132 X |

FOREIGN PATENT DOCUMENTS

| | | | |
|---|---|---|---|
| 47615 | 2/1989 | Japan | 296/188 |
| 4208633 | 7/1992 | Japan | 296/188 |
| 5310092 | 11/1993 | Japan | 293/120 |
| 6286537 | 10/1994 | Japan | 293/102 |
| 2273070 | 6/1994 | United Kingdom | 403/179 |

*Primary Examiner*—Dennis H. Pedder
*Attorney, Agent, or Firm*—Lawrence J. Shurupoff

[57] ABSTRACT

A bi-metal bumper structure comprises an elongated tubular bumper beam made of aluminum, and an elongated reinforcing plate made of steel. The beam is curved in an arc from end to end and has a curved radially inner wall. The reinforcing plate extends lengthwise of the beam and has the same curve as the inner wall of the beam and is rigidly secured in surface-to-surface relation to the inner wall. The reinforcing plate is preferably about one-third the length of the beam.

1 Claim, 2 Drawing Sheets

6,003,912

BI-METAL VEHICLE BUMPER STRUCTURE

FIELD OF INVENTION

This invention relates generally to bumper beam structure for automotive vehicles and more particularly to a bi-metal bumper beam structure having a tubular bumper beam made of aluminum and a steel reinforcing plate.

BACKGROUND AND SUMMARY OF THE INVENTION

The bumper of an automotive vehicle desirably will be light in weight and yet strong and elastic. Optimizing each of these characteristics, without sacrificing any of the others, is one of the goals in bumper design.

The bumper of this invention is a bi-metal structure and offers a unique combination of materials. Preferably, the bumper comprises an elongated tubular bumper beam made of a lightweight material such as aluminum, and a reinforcing plate of steel. This combines the light weight and ductility of aluminum with the elasticity and strength of steel. Smoother vehicle deceleration during frontal impact ultimately results, because the attributes of the bi-metal beam structure reduce the severity or extent of beam failure upon impact and delay the time interval during which failure occurs. By eliminating or drastically reducing abrupt and transient vehicle deceleration, falsely interpreted by the sensor system as an indication calling for deployment of the air bag, premature air bag deployment is prevented.

One object of this invention is to provide a bi-metal bumper structure having the foregoing features and capabilities.

Another object is to provide a bi-metal bumper structure which is composed of a relatively few simple parts, is rugged and durable in use, and is capable of being inexpensively and readily manufactured and assembled.

These and other objects, features and advantages of the invention will become more apparent as the following description proceeds, especially when considered with the accompanying drawings.

DETAILED DESCRIPTION

Figure 1:
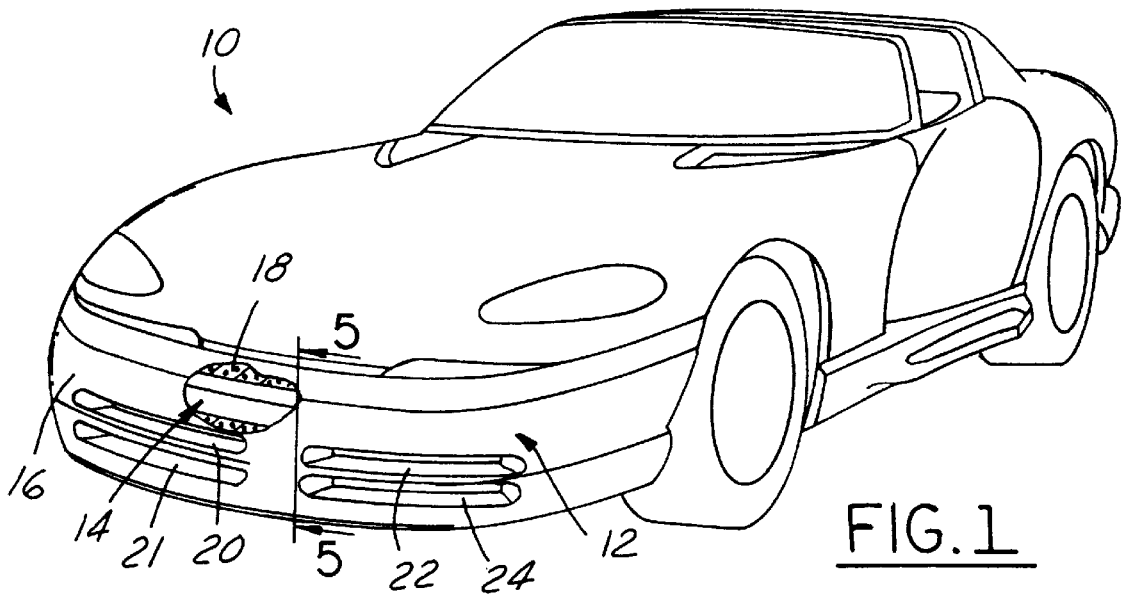
FIG. 1 is a perspective view of an automobile incorporating a vehicle bumper structure constructed in accordance with the present invention, with part of the bumper facia broken away.

Referring now more particularly top the drawings, an automobile 10 is shown having a front bumper structure 12. As will be noted, the bumper structure 12 is curved from side to side of the automobile. The bumper structure includes a bumper beam 14 secured to the front of the vehicle by laterally spaced mounting brackets 15. A plastic ornamental or decorative facia 16 is secured to the vehicle at the front of the bumper beam. Energy absorbing foam material 18 is provided between the facia 16 and bumper beam 14. Vent structures 20, 21, 22 and 24 are provided in the bumper structure 12 for the passage of air which has a cooling effect on the automobile radiator and air conditioning condenser.

Figure 2:
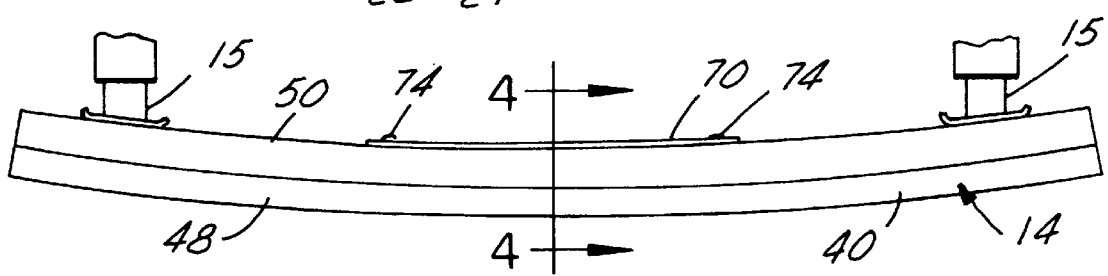
FIG. 2 is a top plan view of the bumper beam incorporated in the bumper structure of the automobile in FIG. 1.
Figure 3:
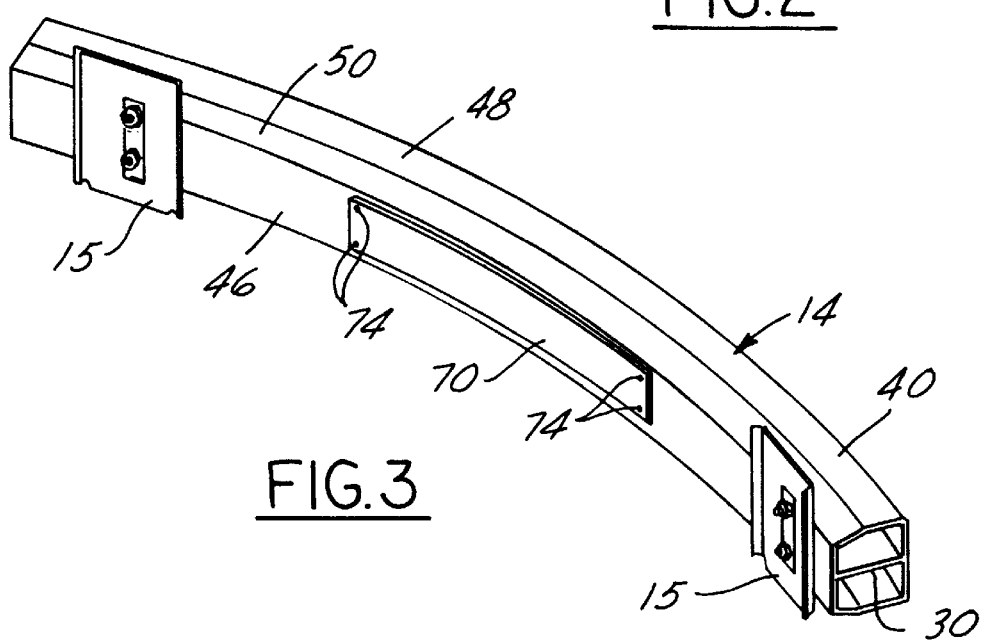
FIG. 3 is a perspective view of the bumper beam shown in FIG. 2.
Figure 4:
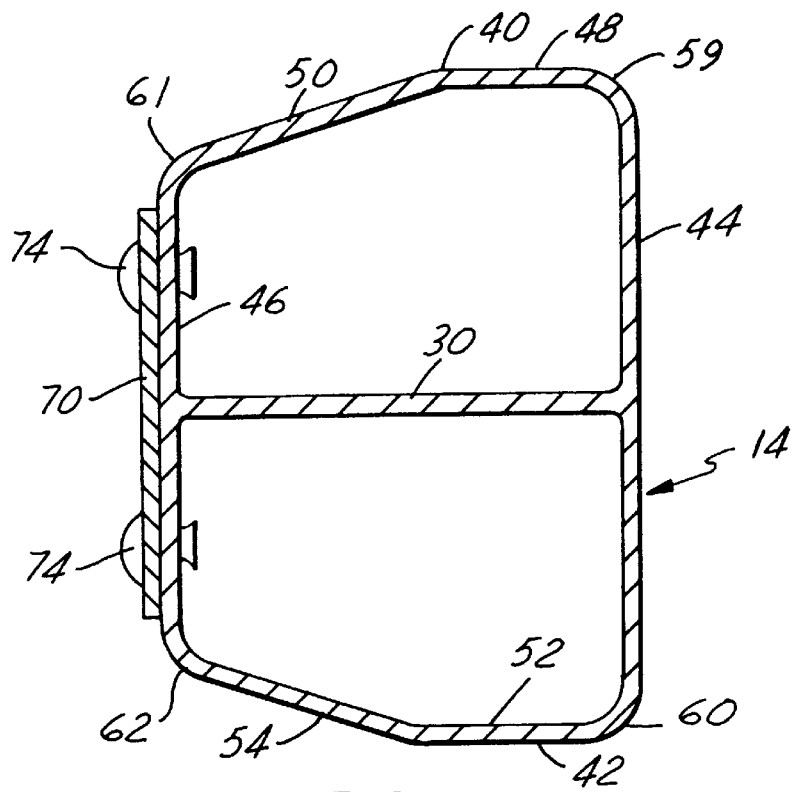
FIG. 4 is a sectional view taken along the line 4—4 in FIG. 2.
Figure 5:
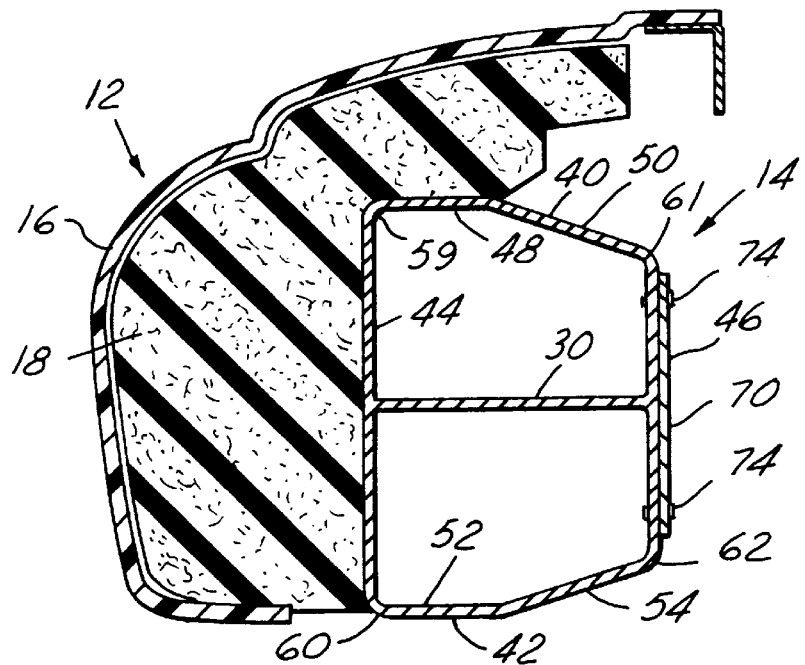
FIG. 5 is a sectional view taken along the line 5—5 in FIG. 1.

Referring to FIGS. 2 and 3, the bumper beam 14 is an elongated member which extends substantially from side to side of the automobile. The bumper beam 14 is fabricated of aluminum which is a lightweight and ductile material with low elongation, and can be made by extrusion. The bumper beam 14 is curved in a continuous arc from end to end. This curvature is provided for several reasons. Firstly, the space behind the central portion of the bumper beam resulting from the curvature permits deflection of the bumper beam in the event of impact with another car without damaging structure behind the bumper beam. The bumper beam tends to straighten out when impacted.

Another reason for the bumper beam curvature is to provide room behind the bumper beam for vehicle components, such as the radiator. Finally, the curvature of the bumper beam is desirable for aesthetic purposes.

In automotive engineering, the bumper beam curvature is referred to as "sweep". The concept of sweep and the determination of sweep values is discussed at length in U.S. Pat. No. 5,080,411, assigned to the assignee of this application and incorporated herein by reference.

As noted in FIG. 3, the bumper beam 14 has a box-like shape in cross-section. This shape is important in that it increases the strength of the bumper beam and provides dimensional stability. A horizontal web or flange 30 is also shown within the box-like structure of the bumper beam midway between the upper and lower walls thereof. The increase in strength due to the box-like configuration and the reinforcing central web permits absorption of energy with consequent reduction in distortion of the bumper beam when it is impacted.

The bumper beam 14 has a top wall 40, a bottom wall 42, a radially outer or front wall 44 and a radially inner or rear wall 46. The top wall 40 has a front portion 48 and a rear portion 50. The bottom wall 42 has a front portion 52 and a rear portion 54. When the bumper beam is mounted on the vehicle, the front portions 48 and 52 of the top and bottom walls are horizontal and the rear portions 50 and 54 are tapered toward one another in a rearward direction preferably at the same angle to the horizontal.

Also, when the bumper beam 14 is mounted on the automobile, the front and rear walls 44 and 46 are vertical.

The front portion 48 of the top wall and the front portion 52 of the bottom wall connect into the top and bottom edges of the front wall 44 in curved or rounded corners 59 and 60. The rear portions 50 and 54 of the top and bottom walls connect into the top and bottom edges of the rear wall 46 in curved or rounded corners 61 and 62.

When the bumper beam is mounted on the automobile, the web or flange 30 is horizontal. This web 30 connects integrally into the front and rear walls.

Both the front and rear walls 44 and 46 of the bumper beam 40 are curved similarly to the overall curvature of the bumper beam, from end to end thereof. An elongated reinforcing plate or strap 70 is secured to the exterior surface of the rear wall 46 of the bumper beam 14. The reinforcing plate extends lengthwise of the rear wall 46 and has the same curvature as the rear wall and is secured thereto in full surface-to-surface relation as by means of rivets 74 of the four corners thereof. The reinforcing plate is centered with respect to the lengthwise dimension of the bumper beam and is of a length about one-third the length of the bumper beam. Thus, the reinforcing plate 70 is rigidly secured to the rear wall of the bumper beam and provides strength and reinforcement thereof. The reinforcing plate is made of steel which is a strong elastic material with high elongation. As such, the reinforcing plate contributes greatly to the overall strength and elasticity of the bumper beam structure. In the event of a frontal impact, the extent or severity of beam failure upon impact is reduced and the time during which failure occurs is also delayed. Premature or unnecessary deployment of the air bag is also prevented. Not only does the bumper have the characteristics of strength and elasticity inherent in steel, but also the light weight associated with aluminum.

What is claimed is:

1. Composite bumper structure for an automotive vehicle comprising an elongated tubular aluminum bumper beam, said beam having opposite ends and being curved in a continuous arc between the ends, and an elongated reinforcing steel plate rigidly secured to said beam, said beam having a curved radially outer, impact-receiving front wall and a curved radially inner rear wall, said steel plate extending lengthwise of the beam and having the same curvature as said rear wall and secured in surface-to-surface relation to the exterior surface of the rear wall, said steel plate being centered with respect to the lengthwise dimension of said beam, the length of said steel plate being about one-third the length of said beam, and said steel plate being elastic and having relatively high elongation and said aluminum beam having relatively low elongation.

* * * * *

UNITED STATES PATENT AND TRADEMARK OFFICE
CERTIFICATE OF CORRECTION

PATENT NO. : 6,003,912
DATED : December 21, 1999
INVENTOR(S) : Schonhoff, et al

It is certified that error appears in the above-identified patent and that said Letters Patent is hereby corrected as shown below:

<u>Title page,</u>
Insert -- [*] Notice:   Under 35 U.S.C. 154(b), the term of this patent shall be extended for 140 days. --

Signed and Sealed this

Sixteenth Day of October, 2001

Attest:

NICHOLAS P. GODICI
Attesting Officer    Acting Director of the United States Patent and Trademark Office